McKINLEY MILLER.
AUTOMATIC CLUTCH OPERATING MECHANISM.
APPLICATION FILED MAY 9, 1918. RENEWED MAR. 13, 1919.
1,317,029.
Patented Sept. 23, 1919.
2 SHEETS—SHEET 1.
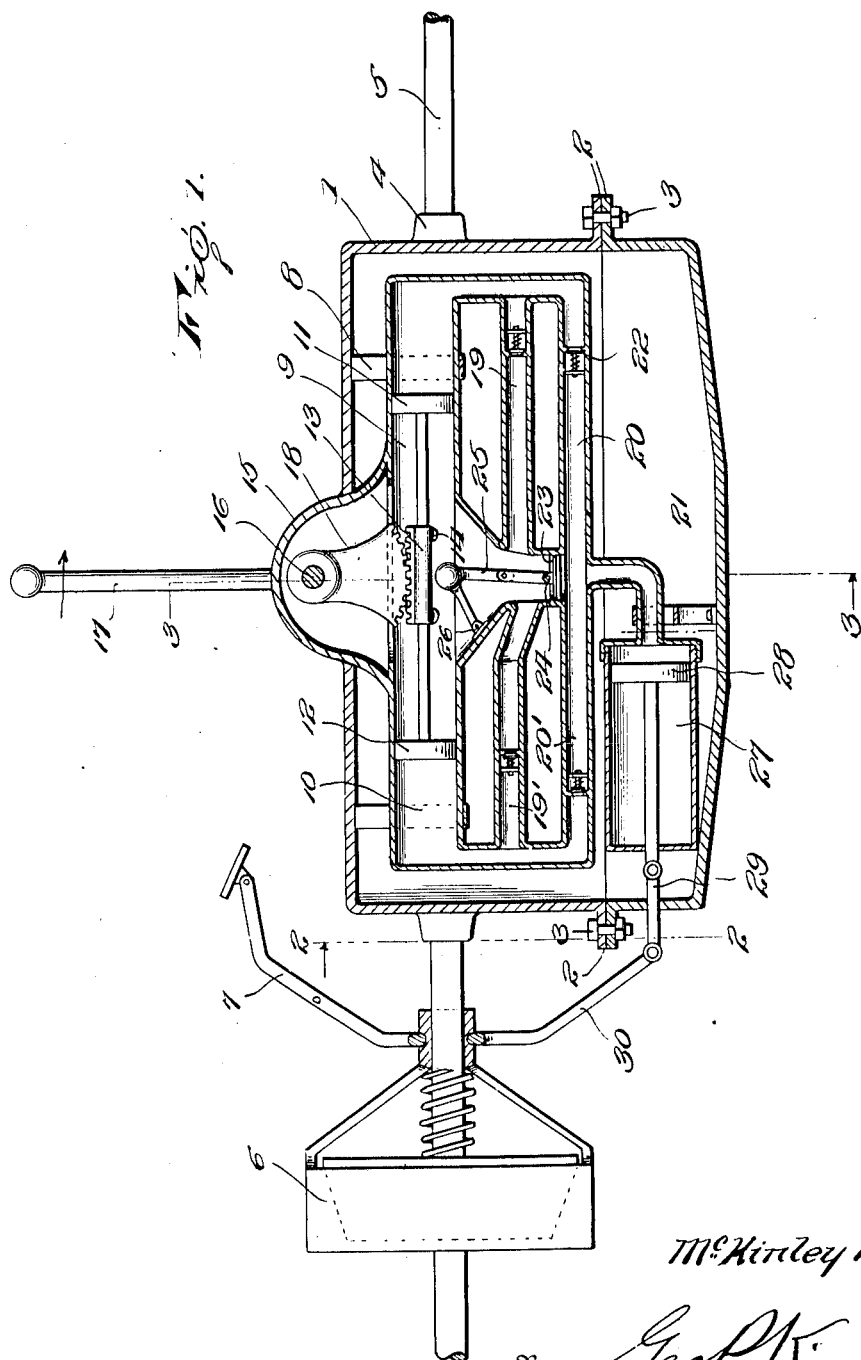
McKinley Miller,
Inventor
By Geo. P. Kimmel
Attorney McKINLEY MILLER.
AUTOMATIC CLUTCH OPERATING MECHANISM.
APPLICATION FILED MAY 9, 1918. RENEWED MAR. 13, 1919.
1,317,029.
Patented Sept. 23, 1919.
2 SHEETS—SHEET 2.
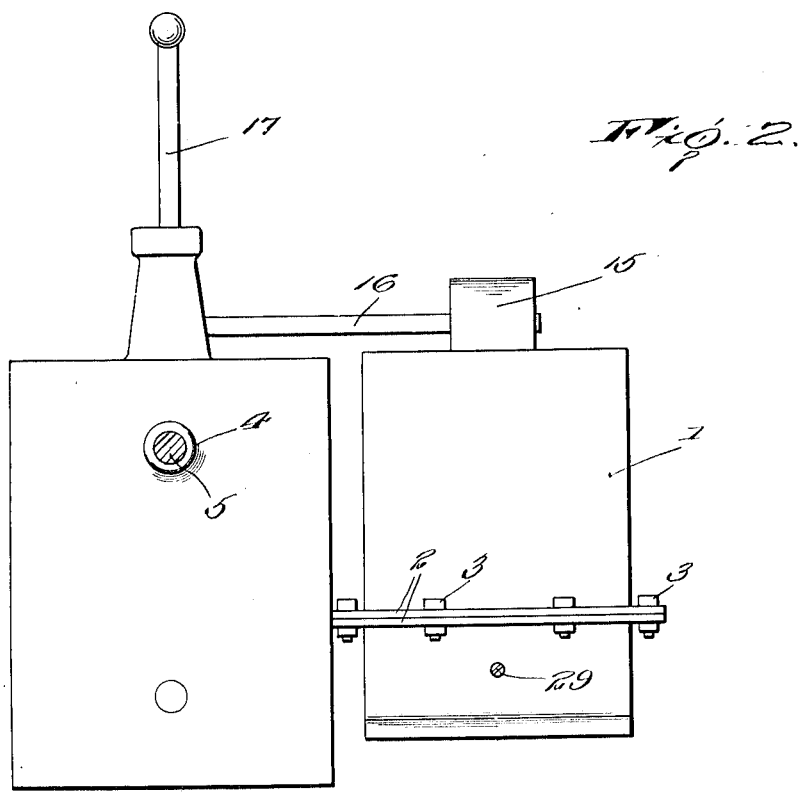
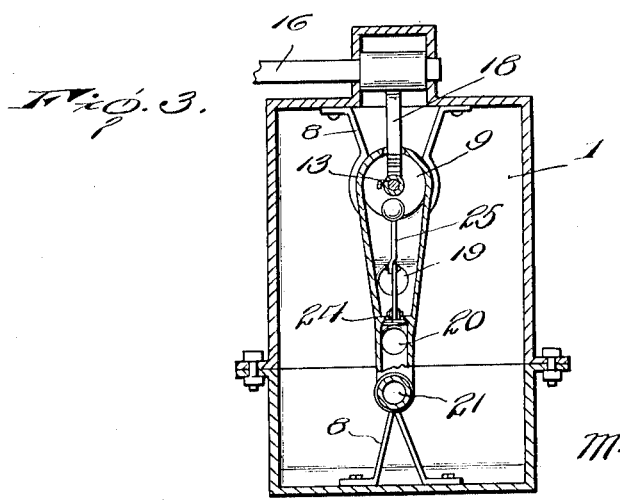

UNITED STATES PATENT OFFICE.

McKINLEY MILLER, OF PANORA, IOWA.

AUTOMATIC CLUTCH-OPERATING MECHANISM.

1,317,029.  Specification of Letters Patent.  Patented Sept. 23, 1919.

Application filed May 9, 1918, Serial No. 233,515. Renewed March 13, 1919. Serial No. 282,497.

*To all whom it may concern:*

Be it known that I, McKINLEY MILLER, a citizen of the United States, residing at Panora, in the county of Guthrie and State of Iowa, have invented certain new and useful Improvements in Automatic Clutch-Operating Mechanism, of which the following is a specification.

This invention relates to improvements in automobile control devices and it is the principal object of the invention to provide an automatic clutch operating mechanism whereby said clutch will be disengaged when the variable speed transmission is operated to establish a desired speed ratio, thus, obviating the necessity of manually shifting the clutch previous to the shifting of the gears of the transmission.

A more specific object of the invention is to provide a novel form of fluid actuated mechanism having connection with the clutch of a motor driven vehicle whereby to move the same to disengaged position previous to the shifting of the transmission gears and then to permit the return of the same to engaged position subsequently to the shifting of said gears.

Other objects will be in part obvious and in part pointed out hereinafter.

In order that the invention and the manner of its application may be readily understood by those skilled in the art, I have in the accompanying illustrative drawings and in the detailed following description based thereon, set forth a preferred embodiment of the invention.

In the drawings:

Figure 1 is a vertical longitudinal section through the improved operating mechanism, Fig. 2 is a vertical section therethrough taken on the line 2—2 of Fig. 1, and Fig. 3 is a similar section taken on the line 3—3 of Fig. 1.

Having more particular reference to the drawings, in connection with which like reference characters will designate corresponding parts throughout the several views, 1 represents the casing of the automatic operating mechanism, the same being composed of complemental sections, the adjacent portions of which are flanged as at 2 and apertured to receive suitable fastening bolts 3 therethrough. Bearings 4 are formed in the opposite ends of the transmission casing and serve to receive the drive shaft of a motor driven vehicle therethrough, said shaft being indicated by the numeral 5 and having the usual form of cone clutch 6 interposed therein, which clutch as will be noted, is provided with the usual form of foot lever 7 the lower end of which is engaged with a slidable spring pressed sleeve arranged on an adjacent portion of the drive shaft 5.

Supported in the housing 1 upon suitable brackets 8 are longitudinally alined cylinders 9 and 10 having pistons 11 and 12 working therein, which pistons have their respective rods interconnected by means of a rack element 13 the lower portion of which carries a pair of spaced cams 14, the purpose of which will be hereinafter more fully described. In this connection, it is to be noted that the upper portion of the cylinders 9 and 10 are enlarged as at 15 to permit the passage of the gear shift lever shaft 16 therethrough, the gear shift lever of course being so arranged with respect to the transmission of the vehicle as to permit shifting of the same in order that a predetermined driving relation can be established; the gear shift lever being shown and indicated by the numeral 17 for the purpose of convenience. A segmental gear 18 is fixedly mounted on the shaft 16 and arranged in the enlarged portion 15; the teeth thereof engaging the teeth of the rack element 13 whereby reciprocal motion will be imparted thereto upon the rocking of the shaft 16. Fluid circulating pipes 19, 19', 20 and 20' communicate with the several cylinders 9 and 10 and discharge into a conduit 21 connected thereto, check valves 22 being arranged in the conduit to control the passage of fluid to and from the cylinders therethrough. A return port 23 is arranged adjacent the ends of the conduits 20 and 20' and is formed with a valve seat in order that a valve element 24 can be engaged thereon, said valve carrying a stem 25 composed of pivotally connected sections, one of which carries an angularly disposed arm having pivotal connection with a portion of one of the cylinders as at 26 and being arranged in the path of travel of the spaced cams 14 carried by the rack element 13.

Supported in the lower portion of the housing 1 is another cylinder 27, the head of which is connected to the free end of the conduit 21, while a piston 28 is arranged therein and has the outer end of its rod pivotally engaged with a connecting link 29 which in turn is connected to the lower end of an angle arm 30, the upper end of said angle arm engaging the slidable sleeve of the clutch 6.

In operation, should the gear shift lever be moved in the direction indicated by the arrow, the piston 11 in the cylinder 8 is formed toward the head thereof, thus causing the fluid arranged therein which is in form of heavy oil or the like to be discharged therefrom into the conduit 20 from whence the same will be passed by way of the conduit 21 into the cylinder 27, engaging the piston 28 and moving the same outwardly. Such movement of the piston 28 will of course cause the slidable sleeve of the clutch element to be moved in a direction from said clutch and as a consequence, cause disengagement of the elements thereof. When the rack element 13 has been moved for a predetermined distance, one of the cams 14 will engage the stem 25 of the valve 24 and move the same downwardly from its seat in the port 23, thus allowing the oil in the cylinder 27 to be exhausted therefrom and returned by way of said port and the conduit 19 to the cylinder 9 as well as the space between the same and the cylinder 10; such action permitting the return of the piston 28 to its normal position with respect to the cylinder 27 and as a consequence allowing the clutch elements to be reëngaged. Obviously, should the gear shift lever be moved in a reverse direction, the passage of the oil through the conduits 19' and 20' would be accomplished in the same manner, thus operating the angle arm 30 to cause disengagement and then reëngagement of the clutch elements.

Manifestly, the construction shown is capable of considerable modification and such modification as is within the scope of my claims, I consider within the spirit of my invention.

I claim:

1. In combination with a gear shift lever and clutch of a motor driven vehicle, a casing, a cylinder arranged therein, a piston in the cylinder having connection with the gear shift lever, fluid circulating means connected to said cylinder, valves arranged in the circulating means, fluid actuated mechanism operable by the fluid in said circulating means, one of said valves being operable upon predetermined movement of said piston to allow the return of the fluid to said cylinder subsequently to the discharge of the same therefrom.

2. In combination with a gear shift lever and clutch of a motor driven vehicle, a casing, a cylinder arranged therein, a piston working in the cylinder having connection with the gear shift lever, fluid circulating means communicating with said cylinder, valves arranged in the circulating means, trip means carried by said piston engageable with one of said valves at predetermined periods, and fluid actuated mechanism connected to the circulating means and operable by the fluid therein, said mechanism having connection with the clutch.

3. In combination with a gear shift lever and clutch of a motor driven vehicle, a casing, alined cylinders arranged therein, pistons working in the cylinders having connection with the gear shift lever, fluid circulating means communicating with said cylinders, a return port communicating with portions of the circulating means and the adjacent portions of the cylinders, valves arranged in the circulating means, another valve engageable over the return port, fluid actuated mechanism connected to the clutch and operable by the fluid in the circulating means, and trips carried by said piston engageable with the valve over the return port for opening the same, at times.

In testimony whereof I affix my signature hereto.

McKINLEY MILLER.